US00RE34268E

United States Patent [19]

Müller

[11] E Patent Number: Re. 34,268

[45] Reissued Date of Patent: Jun. 1, 1993

[54] BRUSHLESS DIRECT CURRENT MOTOR SYSTEM

[75] Inventor: Rolf Müller, Munich, Fed. Rep. of Germany

[73] Assignee: Papst-Motoren GmbH & Co. KG, St. Georgen, Fed. Rep. of Germany

[21] Appl. No.: 418,108

[22] Filed: Oct. 6, 1989

Related U.S. Patent Documents

Reissue of:

[64] Patent No.: 4,698,542
Issued: Oct. 6, 1987
Appl. No.: 799,000
Filed: Nov. 18, 1985

U.S. Applications:

[63] Continuation of Ser. No. 581,337, Feb. 17, 1984, Pat. No. 4,554,473, which is a continuation-in-part of Ser. No. 244,971, Mar. 18, 1991, abandoned.

[30] Foreign Application Priority Data

May 10, 1980 [CH] Switzerland ..... 3658/80

[51] Int. Cl.[5] ..... H02K 21/12

[52] U.S. Cl. ..... 310/67 R; 310/62; 310/90; 310/261

[58] Field of Search ..... 310/67 R, 68 R, 62, 310/63, 156, 90, 261, 154, 89; 318/138, 254, 254 A; 415/182.1; 417/354

[56] References Cited

U.S. PATENT DOCUMENTS

| | | | |
|---|---|---|---|
| 3,601,507 | 8/1971 | Harris | 310/67 R |
| 4,164,690 | 8/1979 | Müller | 318/254 A |
| 4,373,861 | 2/1983 | Papst et al. | 417/213 C |
| 4,554,473 | 11/1985 | Müller | 310/67 R |
| 4,564,335 | 1/1986 | Harmsen et al. | 417/213 C |
| 4,682,065 | 7/1987 | English et al. | 310/67 R |
| 4,698,542 | 10/1987 | Muller | 310/67 R |

FOREIGN PATENT DOCUMENTS 1628349 5/1971 Fed. Rep. of Germany .

*Primary Examiner*—R. Skudy
*Attorney, Agent, or Firm*—Fitch, Even, Tabin & Flannery

[57] ABSTRACT

The invention relates to a brushless direct current motor system that includes an outer rotor receiving a load member such as a fan wheel having a plurality of blades. An axial extension of the rotor functions as a drive boss whose diameter is independent of the diameter of the motor stator core and is step-wise smaller in diameter at its outer closed end than at its inner opened end.

6 Claims, 3 Drawing Sheets

BRUSHLESS DIRECT CURRENT MOTOR SYSTEM

Matter enclosed in heavy brackets [ ] appears in the original patent but forms no part of this reissue specification; matter printed in italics indicates the additions made by reissue.

This is a continuation, of application Ser. No. 581,337 filed Feb. 17, 1984 now U.S. Pat. No. 4,554,473, issued Nov. 19, 1985 which is a continuation-in-part of application Ser. No. 244,971, filed Mar. 18, 1981 now abandoned.

The invention relates to a brushless direct current motor system.

Brushless direct current motors are typically provided with an electric circuit which forms the drive electronic systems in the instance of disk storage drives, and r.p.m. control stage for the motor. The drive electronic system comprises the electronic components that replace brushes and commutators of conventional direct current motors. The r.p.m. control may include an optical tachometer, which senses the r.p.m. of the motor shaft and emits corresponding signals to the electronic drive system to control the r.p.m. of the shaft. At the same time the optical unit of the tachometer can be expediently applied as position-determining means for determining the position of the rotor in order to switch the currents of the motor windings. Instead of the tachometer as a position detector, a Hall-generator can be also used or a Hall-generator in conjunction with an IC.

The electronic drive system and the r.p.m. control circuit sometimes are provided in a control unit separate from the motor. Such a separate control unit takes additional space and requires a cable for connecting the control unit with the motor.

In some uses, a separate control unit of conventional direct current motors is inconvenient because of limited space. For example, magnetic disk or plate drive systems are desirably as small and compact as possible, yet the drives of the magnetic disks should desirably lend themselves to the same possible uses as for larger magnetic plate drive systems. Brushless direct current motors are particularly adapted for such drives because of their reliability, absence of sparks, which occur with brushes of conventional direct current motor, and simple design when such a motor has a part which doubles as a boss for supporting, for example, two spaced apart magnetic plates. Conventional brushless direct current motors, however, have been unsatisfactory in such instance because of inadequate space within the motor for the associated control unit.

Brushless direct current motors also are used in axial-flow fans, but many axial-flow fans are installed in electronic appliances to serve as ventilators where there is a size restriction. Thus, the external dimensions of the casing jacket are likely predetermined and fixed. This becomes critical in very small ventilators, because of the proportion of the diameter of the motor to the diameter of the surrounding fan housing. Because of this, there is a limit to the amount of radial dimension available for the fan blades. It is important, therefore, that the air input be as efficient as possible to maximize the air delivery of the fan even in spite of static pressures often encountered in fan installations. This invention is advantageously useful for brushless direct current motors used in both axial-flow fans and in disk storage drives.

An object of the invention is to provide a brushless direct current motor system having a rotor of simple design as a boss for a stack of disks, particularly small diameter disks driven by a high quality bearing system.

Another object of the invention is to provide a brushless direct current motor system having a rotor of simple design usable as a boss for carrying and driving disks or as a fan wheel for a plurality of fan blades directly attached or welded to the boss, the boss being driven by a high quality bearing system.

Still another object of the invention is to provide a brushless direct current motor of the outer rotor type that includes a step-wise smaller diameter on the closed end of the outer rotor than the diameter at the open end thereof such that for use in driving disks, disks of standardized bores may be driven and for use in axial flow fans, the inlet side may have a better flow structure to permit higher volumes of air or at least permit a press fit of a fan hub over the closed end of the housing without increasing the overall diameter of the rotor housing.

By providing a brushless direct current motor system having an outer rotor, and having at least one stationary switch support supportingly mounted on the motor stator these objects are solved, according to the invention, by mounting the electronic drive system on the stator within the closed end of the outer rotor housing.

Thus, according to the invention, the electronic drive system can constitute a part of the motor in a brushless direct current motor system. An axially compact structural unit is provided which lends itself to many applications. It will be seen that the structure allows a larger axial distance between bearings to provide a strong bearing system. According to a preferred embodiment, the drive shaft is surrounded by means which hold the bearings that in turn support the rotatable motor shaft. The means is disposed in the motor housing. A circuit component board is connected to the means and is preferably constructed as an annular, plate-shaped member to support one or both sides of at least part of the electronic drive system. The dimensions of the annular component board are expediently adapted to the motor housing. Also a plurality of such members can be disposed one over another in accordance with the height of the available axial space. In such a way the motor system may provide a closed unit with only lead lines extending outwardly for connection to an outside source of power. In operation, the space-saving overall arrangement is reliable. The system also includes means for dissipating heat and it allows a step-wise construction on the hub side of the motor, advantageous for uses of the motor in both disk drives and axial flow fans.

The invention will now be described in greater detail showing embodiments illustrated in the accompanying drawings, which are:

Figure 1:
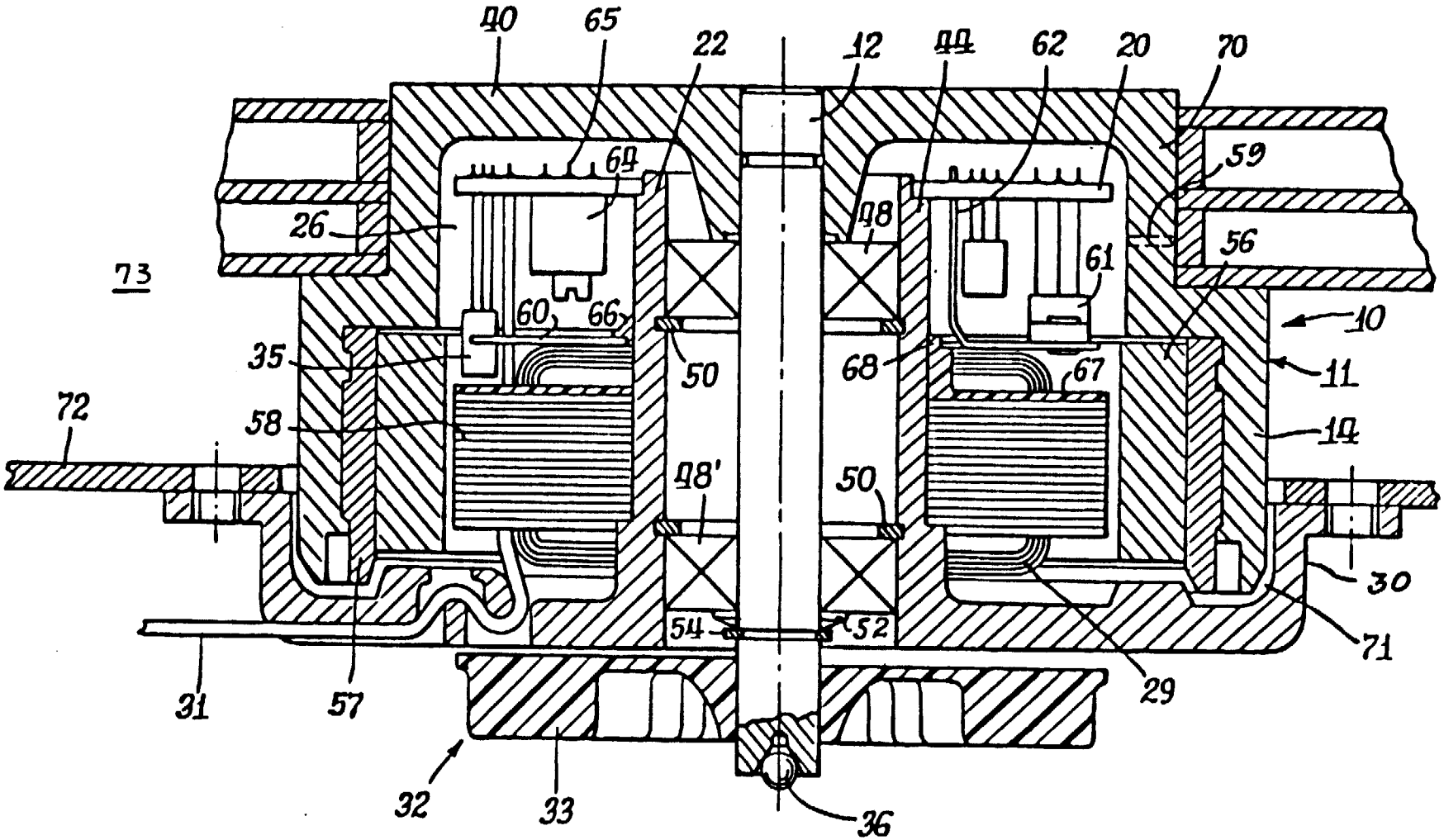
FIG. 1 is a side sectional view of a brushless direct current motor system according to the invention.

Referring first to FIG. 1, the direct current motor system 10 comprises a brushless direct current motor 11 with an outer rotor *housing* 14 which, being mounted on a rotatable drive shaft 12, surrounds motor windings 29, stator *iron core* 58 and permanent magnets 56.

The foregoing components of motor 11 are known as such. Their assembly constitutes a conventional brushless direct current motor.

An annular switch support or component board 20 is connected to a stationary part or a central support or holding means 22 of the motor 11. An electronic drive system and an r.p.m. control circuit are mounted on the component board 20 to form together with the motor 11 a compact unit.

As shown in FIG. 1, the various components of the electronic drive system, for example, output stage transistors 61 of the r.p.m. control circuit, a Hall-IC 35, the component board 20 and a heat sink 60, are accommodated in one chamber between the bottom or closed end 40 of the rotor housing 14 and the stator winding 29. Lead lines 31 extend from the component board 20 for connection to a source of direct voltage.

The shaft 12 is attached to the [bottom] *closed end* 40 of housing 14. The housing 14 is open at one end so that a centrally disposed bearing tube or casing 44 surrounding the shaft 12 can extend from the housing. The tube 44 is a part of central holding means 22. It is either pressed into a boss connected to a flange 30 or is cast together with the flange 30 to form an integral part. The shaft 12 is rotatably supported in the tube or casing 44 in two bearings 48, 48', so that the shaft and the housing 14 rotate relative to the casing and the flange 30 when the flange is mounted in a stationary position relative to adjacent members, as will be explained hereinafter in detail. Two spaced guard rings 50 maintain the bearings in place. Cup springs 52 held by the guard ring 54 axially bias the bearings 48, 48' relative to each other.

A rotary magnetic ring or a plurality of permanent magnets 56 are mounted on the inside surface of the rotor housing 14, and they rotate together with the housing 14. The rotor housing 14 may be cast of an aluminum alloy. This material is unsuitable as a magnetic return circuit, and so a soft iron ring 57 is provided for the magnetic return circuit. Such ring is unnecessary if the housing 14 is deep-drawn. The outer diameter of the annular component board 20 is preferably less than the diameter of the core 58. Thus, the component board 20 is not greater in diameter than the air gap diameter of the stator and, together therewith, makes a compact unit.

The bearing tube 44 is axially extended for receiving the electronic members of the electronic drive system and r.p.m. control circuit. In addition to the disposition of the structural members, care must be also taken of suitable dissipation of heat, particularly in connection with the output stage transistors 61 of the electronic drive system. There is provided for such purpose a punched bent member as a cooling body or heat sink 60, to which are connected in a heat-transfer relationship, the heat dissipation surfaces of the output stage transistors 61. The heat sink 60 itself is about 0.6 to 1 mm thick, connected by supports 62 to the component board 20.

The electronic members are expediently arranged as shown in FIG. 1, since all soldering connections can there be performed in one step, as, for example, by dip soldering. A potentiometer 64 is provided for adjusting certain portions of motor operation or for equalizing tolerances of different parts. The potentiometer 64 is adjustable by a screwdriver through a bore (not illustrated) in the flange 30 and one of the grooves in the core 58. For such purpose, the setscrew of the potentiometer 64, the bore in the flange 30 and the groove in the *stator iron* core 58 lie in a substantially straight line.

In such an integral formed part as the heat sink 60, the output stage transistors 61 must be electrically insulated from, although physically connected to, the heat sink 60. If the heat sink 60 is expediently subdivided according to the number of the output stage transistors 61, however, the insulation can be dispensed with. This saves time of assembly and various insulating parts and also improves the dissipation of heat.

The heat sink or sinks 60 are connected to the component board 20, preferably via the supports 62 soldered to the component board 20. The heat sinks 60 are soldered to the component board 20 along with the soldering of the other members. If necessary, the heat sinks 60 are additionally connected to the stationary parts, or stator in a suitable manner, such as by fastening members or linking connections 66 on the tube 44 or in the zone of a collar 68 or by mounting legs of the end plate 67 [(not illustrated]. These connections reduce the possibility of the movement of the heat sink 60.

The rotor housing 14 is axially extended in accordance with [the] axial extension of bearing tube 44. This extension projects into [the drive boss] *a drive boss or hub* 70 in the central bore of one or more magnetic disks. Consequently, it is expedient to make the diameter of the drive boss 70 complementary to or substantially equal to that of the central bore of the disks regardless of the required driving capacity of the motor and of the resulting best air gap diameter. Thus, the axial dimension is lengthened by a strong bearing system to allow the [hub] *drive boss* 70 to have a diameter that is independent of the diameter of the stator core 58 and the air gap. This permits a free chamber 26 inside the drive boss 70 to accommodate the component board, including the electronic members and the heat sinks. As mentioned earlier, the component board is preferably of less diameter than the stator iron and air gap.

In a drive motor for magnetic memory disks, the housing 14, including the drive boss 70 and the bottom 40, encloses the inside of the motor. This prevents the penetration of dirt particles from inside the motor to the magnetic disks. The only direct connection to air inside the motor exists only through a gap 71, between the rotor *housing* 14 and the flange 30. But a suitable length of the gap 71 provides that the possible exit of dirt particles is very small and there is no disturbance in the safety of operation of the magnetic disks. A wall 72 is shown as a broken fragment and separates a space of maximum cleanness 73 from the rest of the motor system so that any dirt particles from the bearing 48' do not enter the area of the magnetic disks.

When used for driving magnetic disks, the motor 11 includes a fan 32 having several fan blades 33 mounted at the free end of the drive shaft 12. The flange 30 is cooled by an intensive movement of air around it, so that lost heat is effectively conducted from the motor 11 to the outside via integral unit which includes the flange 30 and the bearing tube 44 as mentioned earlier.

To prevent an electronic charge in the rotor bell, the drive shaft 12 is, by means of the ball 36 and a spring contact (not illustrated), connected to the chassis of the apparatus. An electrical charge of the rotor would likewise disturb the operation of the magnetic disks.

The motor 11 is also suitable for other applications. In such cases the requirement of cleanness is not as exacting, so that there also can be apertures 59 in the rotor bell, if necessary. These apertures would perform the function of evacuating heat or of permitting access for adjusting a potentiometer. Such motors can directly drive different devices or fans. For the purposes of ventilation, fan wheels or fan blades can be directly attached or welded to the rotor housing 14 and/or the drive boss 70.

In this connection, it should be noted that the same features of this invention that permit the [hub] *drive boss* 70 to be reduced in diameter so as to accept directly the magnetic disks having standardized bores, also make the motor 11 advantageously useful for axial-flow fans. As disclosed in copending U.S. Ser. No. 140,883, filed Apr. 16, 1980, *now U.S. Pat. No. 4,373,861, issued Feb. 15, 1983,* and in copending U.S. Ser. No. 466,642, filed Feb. 15, 1983, *which through continuation application Ser. No. 718,832, filed Apr. 2, 1985, became U.S. Pat. No. 4,564,335, issued Jan. 14, 1986,* the feature of a conical configuration on the hub of the fan wheel on the inlet side in cooperation with the flaring corner portions or pockets of the fan housing, surprisingly produces the advantage of a substantial pressure increase. Thus, particularly in the instance of small, compact axial-flow fans operating in the region of relatively low air flow rates, the fan can deliver a larger amount of air at higher static pressures.

Figure 2:
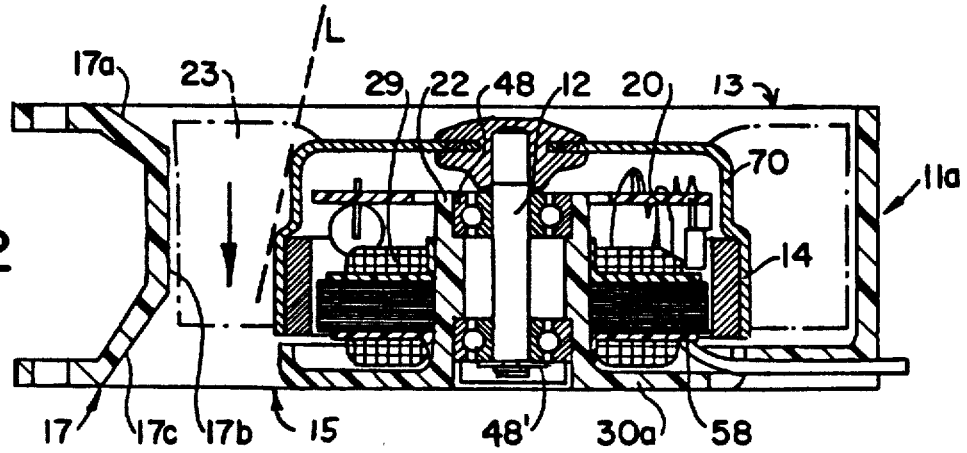
FIG. 2 is a side sectional view, taken along the line A—A of FIG. 5, of another embodiment utilizing the invention in an axial-flow fan where radial blades are attached directly to the outer rotor and the housing is asymmetrical in section.
Figure 3:
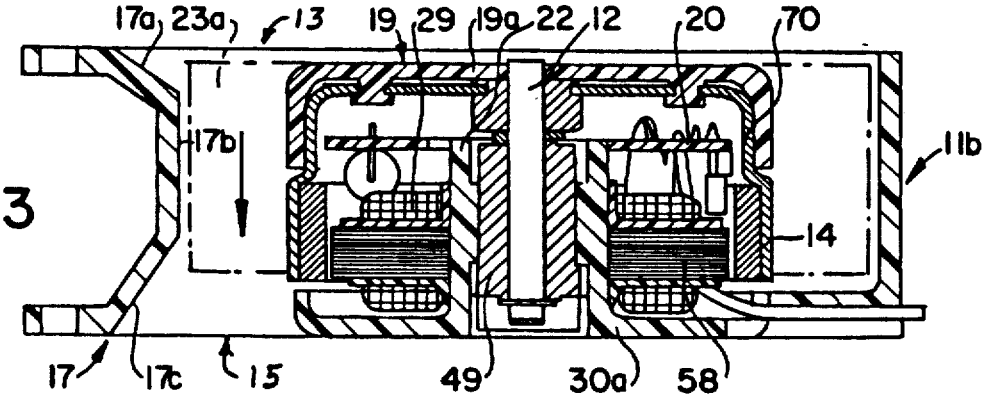
FIG. 3 is a side sectional view, taken along the line A—A of FIG. 5, of yet another embodiment utilizing the invention in an axial-flow fan where a fan wheel is inserted with its hub press-fit over the outer rotor and the housing is asymmetrical in section.
Figure 4:
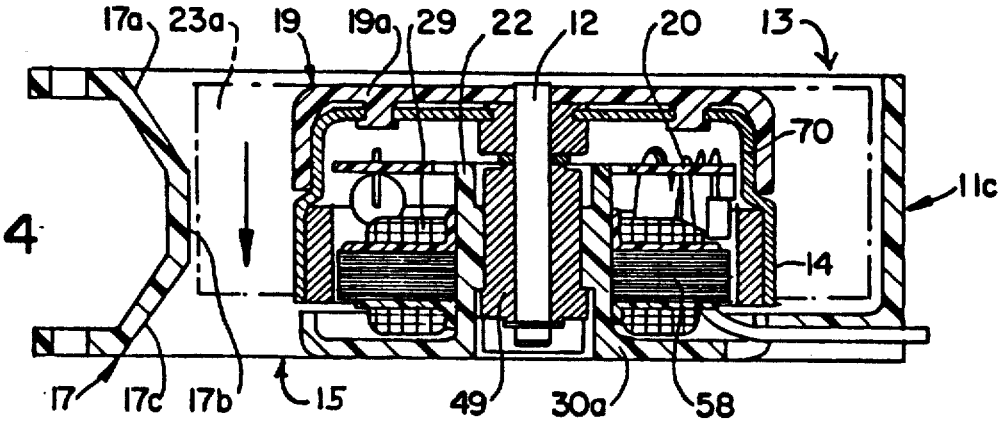
FIG. 4 is a side sectional view, taken along the line A—A of FIG. 5 of still a third embodiment utilizing the invention in an axial-flow fan in a manner similar to that shown in FIG. 3, except that the housing is symmetrical in section.

Such a construction can be seen in connection with motor 11a in FIG. 2 wherein an indented or stepped outer portion of the [hub] *drive boss* 70 provides a conical or tapered affect as illustrated by the dashed line L. In FIGS. 2, 3 and 4, like parts of those motors and the motor of FIG. 1 carry the same reference numbers. The direction of the air flow is indicated by the arrow. *Thus air enters these axial-flow fans at an inlet or input side 13 and is discharged from an outlet or exhaust side 15.* A plurality of fan blades 23 are uniformly distributed around the periphery of the rotor housing 14 and are suitably affixed to the outer surface of the rotor housing such as by welding. These fan blades extend over substantially the entire axial length of the rotor housing 14. Thus, at the air inlet side of the fan, it will be seen from an examination of the angle of the dashed line L that the smaller diameter of the [hub] *drive boss* 70 provides a greater cross section of air passage on the inlet side than would be possible if the diameter of the [hub] *drive boss* 70 were equal to the outer diameter of the rotor housing 14 at its open end.

As used herein in connection with the cup-shaped rotor *housing* 14, the terms "open end" and "closed end" are used mainly to distinguish between the two ends. Thus the term "closed", particularly in reference to a motor used in fans, need not exclude small openings that may be provided in the otherwise closed end of the rotor housing.

Each of the motors shown in FIGS. 2, 3 and 4 have a fan housing 17 that forms the outer extremes and provides structure for mounting the motor and fan wheel or fan blades. The housing 17 dimensions are predetermined according to the standards in the industry, and the housing 17 may have small dimensions where the square outside faces have a length of about 80 mm. The fan housing 17 includes a central cylindrical portion indicated by 17b, and eminating from that toward the inlet side is an inclined wall section 17a. The inclined wall section 17a is provided on at least four diagonally opposite corners of an externally square fan housing 17.

Returning to FIG. 2, it can be seen that by means of this arrangement a broader inlet cross section is obtained over the entire inlet zone of the axial-flow fan. The front edges of the fan blades 23 extend into this cross section, and they are brought up approximately to the forward end face of the fan housing 17 with their leading edges. At their inner edges, the fan blades are welded to the rotor housing 14, particularly at the drive boss 70. The fan blades 23 may be welded conventionally to the rotor housing 14 by a special process disclosed in German Pat. 1,628,349. The fan blades are made of very thin sheet steel, and are arranged equally around the periphery, and a very large free inlet region is obtained which is enlarged even more by the provision between the angled dashed line L and the inclined [wall 17a] *wall section 17a.*

Figure 5:
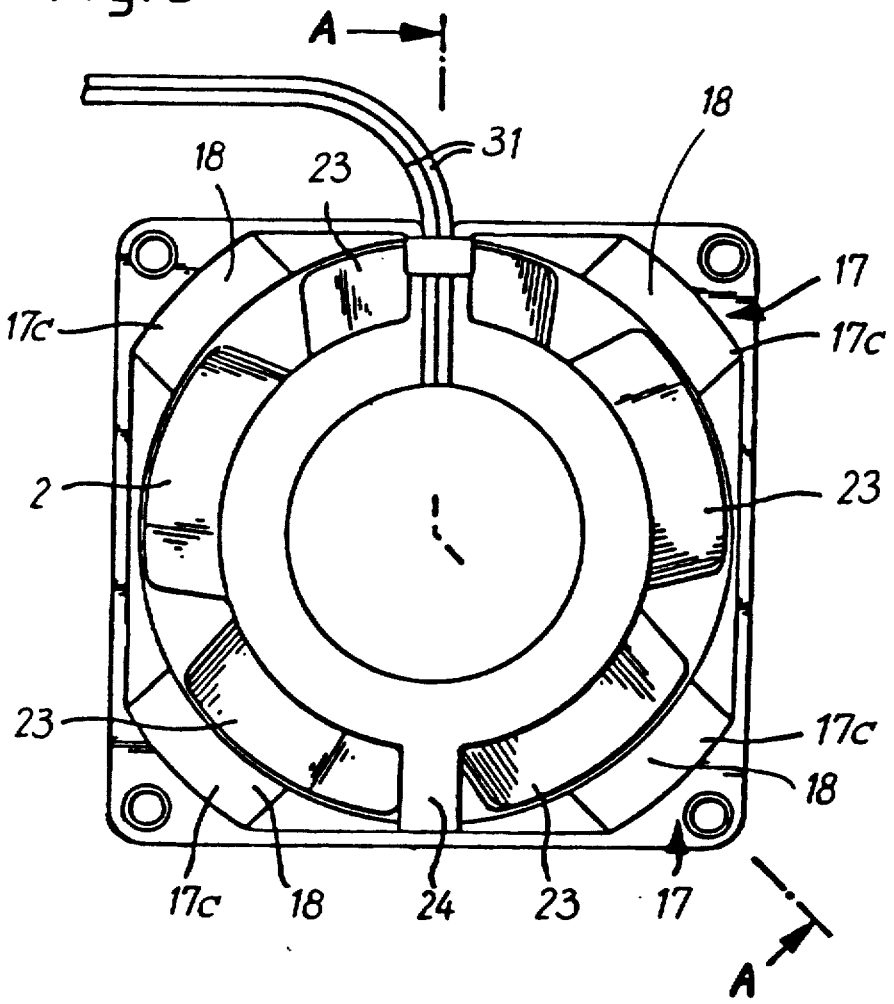
FIG. 5 is a schematic view of an axial-flow fan according to the invention as seen from the exhaust side.

Because of the fan housing 17, as can be seen from *a combination of* FIGS. 2 and 5, is provided, on the four diagonally opposite corners of the externally square fan housing 17, with corner pockets 18, the inclined wall sections 17a of which eminate from the central cylindrical [middle piece] *portion* 17b, the inlet cross section is additionally enlarged at these four corners. It has been found that an axial-flow fan constructed in this way has advantages over conventional kinds of construction, especially if it must operate against high static pressures in the installed condition. In such instance, the fan yields surprisingly larger amounts of air.

The welding process for attaching the fan blades 23 to the rotor housing 14 as described in the aforementioned German patent, is useful for mass production and generally requires a very large, expensive welding machine. If axial-flow fans are to be produced in smaller quantitites, or if they are to be produced in locations far distant from the welding machine, it is much less expensive to produce a fan wheel of molded plastic. There, the blades distributed evenly about the periphery of the hub, are molded along with the hub to form a unit.

The invention of this application, however, also lends itself to use in axial-flow fans having the unitized molded plastic fan wheel. Such a motor is shown in FIG. 3, and the molded plastic fan wheel 19 having a hub 19a which carries the evenly distributed fan blades 23a about its periphery, is applied to the rotor housing 14 by being press-fit over the [reduced hub portion] *reduced portion of drive boss* 70 at the rotor housing 14 and secured in a suitable manner. Comparing this structure with that in FIG. 2, it will be seen that the angled dashed line L, if drawn in the structure of FIG. 3, would be substantially vertical. That is, the outer diameter of the plastic hub 19a is substantially the same as the outer diameter of the rotor housing 14 near its open end.

The advantage of the plastic fan wheel, of course, is that it results in an axial-fan of overall less expense than that shown in FIG. 2. It can be understood, however, that the outer diameter of the hub 19a is still of a smaller dimension than had it been placed over the outer rotor of a conventional DC brushless motor. Thus, this invention finds advantageous use in this application, also.

The motor structure shown in FIG. 4 is similar to that in FIG. 3 except for one important difference. It will be noted in FIG. 3 that the central cylindrical [mid piece] *portion* 17b is flanked by an inclined [wall 17a] *wall section 17a* toward the inlet side and an [inclined wall] *inclined wall section* 17c toward the outlet side. By inspection, it will be seen that the [wall 17a] *inclined wall section 17a* is shorter and at a slightly larger angle to the [mid-piece] *central cylindrical portion 176* than the wall 17c. Such a fan housing is referred to as an asymmetrical housing. In contrast, the structure in FIG. 4 is a symmetrical housing where the angle and length of the [walls] *inclined wall sections* 17a and 17c flanking the central cylindrical [mid-wall] *portion* 17b are substantially the same length and of the same angle with respect to the [mid piece wall] *central cylindrical portion*. The reduced diameter [hub] *drive boss* 70 finds advantageous use in both of these structures.

It has been indicated that the bearing system in a brushless DC motor for direct drive of magnetic disks must be of high quality and accuracy. Hence, the motor shown in FIG. 1, in which the load on the [hub] *drive boss* 70 is a plurality of magnetic disks, is shown with spaced apart ball bearings 48 and 48'. These bearings are held securely within the bearing tube 44 which constitutes the central holding means 22. Not all requirements for brushless DC motors, however, are as rigid as those for direct drive of magnetic disks. In this connection, it will be noted in the axial fans shown of FIGS. 2, 3 and 4, that spaced apart ball bearings are shown in the motor 11a in FIG. 2, whereas sleeve bearings 49 are shown in motors 11b and 11c in FIGS. 3 and 4, respectively.

Although the central holding means 22 is shown to be the bearing tube 44 in the drawings, it should be understood that for many applications, it would be acceptable for the central holding means to consist merely of the inside of the stator iron core 58. Thus, the stator iron could provide the support for either the ball bearings 48, 48' or the sleeve bearings 49 in certain applications of the DC brushless motor. The component board 20 would then be supported by means of pins to the stator in a suitable location.

A further modification of the structure is in providing the motors 11b and 11c of FIGS. 3 and 4, respectively, with the fan housing 17, the central holding means 22, the flange 30a, and the supporting struts 24 (FIG. 5) as a one-piece molded plastic. At present, such structure has limited applications and is thought to be useful only in the instance of a two-pulse brushless DC motor, especially a reluctance torque motor having auxiliary torques, all resulting in high efficiency and low heat generation. Heretofore, plastic has been used only in the very inexpensive installations, because heat is destructive to the rigidity of the plastic structure. With the more highly efficient DC brushless motors with low heat generation, however, a plastic structure is now practical for certain other applications.

Thus, there has been provided in accordance with this invention an internal motor structure for a brushless direct current motor system including the electronic drive system and r.p.m. control circuit mounted on a component board internally of the motor in such a manner as to enable a step-wise smaller diameter on the closed end of the hub of the outer rotor than the diameter of the open end of the outer rotor. Such step-wise smaller diameter allows for such a motor to be used in the direct drive of magnetic disks, where the disks have standardized bores, and in axial-fans where a larger cross section on the air input side of the fan, particularly a fan of small dimensions, to be used in applications where it is important to deliver higher volumes of air at higher pressures. Some principal advantages of such a motor structure are (1) axial compactness, (2) easy access to the electronic circuit board during motor production and repair, and (3) independency of the diameter of the drive boss to the stator and air gap.

Although we have shown and described this invention in connection with certain embodiments, alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. A brushless direct current motor system, said system including an outer rotor type motor comprising:

a cup-shaped *outer* rotor housing having *inner and outer surfaces, an open and a closed end and* a shaft concentrically mounted therein extending internally thereof, the outer [portion] *surface* of said housing being formed as a drive boss to receive *and directly drive* at least one load member [for the direct driving thereof], the load member being a fan wheel having a plurality of blades, the fan wheel being a unitized assembly including a hub and radially extending fan blades mounted thereon uniformly [around the periphery] *therearound ;* a bearing system in said motor receiving said shaft so as to rotate said *outer* rotor housing;

stator means concentrically mounting said bearing system within said motor, said *outer* rotor housing including permanent magnets on its [inside] *inner* surface and being mounted to rotate around [the periphery of] said stator means [and] separated *therefrom* by an air gap, the [outside] *outer surface* of said *outer* rotor housing at its closed end being provided with a step-wise reduction in its outer diameter to provide a reduced diameter hub portion [thereof, allowing the outside of this portion of the rotor housing] to mount and drive said unitized assembly; and the hub of said unitized assembly being [dimensioned to be press fit over] *fixed to* the reduced diameter hub portion of said outer rotor *housing.*

2. A system according to claim 1 wherein the diameter of the hub of said fan wheel is not greater than the diameter of the cup-shaped *outer* rotor housing at its open end.

3. A system according to claim 2 wherein said system is part of an axial-flow fan *having an air inlet side and an air exhaust side* and further comprising an outer fan housing of multi-corner profile, said *outer fan* housing having a central cylindrical portion surrounding the fan [blade] *wheel*, said *outer fan* housing being broadened on the exhaust side of the *central* cylindrical [central] portion by corner pockets into the [regular] multi-corner profile, said profile circumscribing [the outer diameter of] the fan wheel.

4. A system according to claim 3 wherein said corner pockets are formed by inclined [walls] *wall sections* which extend from said central cylindrical portion.

5. A system according to claim 4 wherein the inclined wall *sections also extend from the central cylindrical portion* on the air inlet side [is] *and are* axially shorter than and at a different angle from the inclined wall *sections* on the [outlet] *exhaust* side of the central cylindrical portion, forming an asymmetrical cross section in the *outer* fan housing.

6. A system according to claim 4 wherein the inclined [walls] *wall sections also extend from the central cylindrical portion and these sections* on both the inlet and [outlet] *exhaust* sides of the central cylindrical portion are of substantially [the] *a* same angle and length *with respect* to each other, forming a symmetrical cross section in the *outer* fan housing.

* * * * *